United States Patent [19]

Lile et al.

[11] 3,789,369

[45] Jan. 29, 1974

[54] THIN FILM MIS STORAGE DIODE

[75] Inventors: Derek L. Lile; David A. Collins, both of San Diego, Calif.

[73] Assignee: The United States of America as represented by the Secretary of the Navy, Washington, D.C.

[22] Filed: July 10, 1972

[21] Appl. No.: 270,422

[52] U.S. Cl. ........... 340/173 LS, 307/304, 307/311, 307/317, 317/235 N

[51] Int. Cl. ........................ G11c 11/36, G11c 11/42

[58] Field of Search...317/235 N; 340/173 LS, 173 PP; 307/317, 311, 304

[56] References Cited

UNITED STATES PATENTS

| | | | |
|---|---|---|---|
| 3,497,698 | 2/1970 | Phelan | 317/235 N |
| 3,701,979 | 10/1972 | Smith | 340/173 LS |
| 3,268,331 | 8/1966 | Harper | 340/173 PP |
| 3,673,578 | 6/1972 | Schneider | 340/173 LS |

OTHER PUBLICATIONS

Krag, Effects of Light on the Charge State of InSb-MOS Devices, Journal of Applied Physics, Vol. 40, No. 9, 8/69, pp. 3,661–3,667.

*Primary Examiner*—Bernard Konick
*Assistant Examiner*—Stuart Hecker
*Attorney, Agent, or Firm*—R. S. Sciascia; G. J. Rubens; T. M. Phillips

[57] ABSTRACT

The method of storing information in a MIS light sensitive diode whose photovoltaic response may be altered reproducibly and reversibly by irradiation with suitable wavelength electromagnetic radiation or the temporary application of an electric voltage.

10 Claims, 2 Drawing Figures

THIN FILM MIS STORAGE DIODE

CROSS REFERENCE TO RELATED APPLICATION

Derek L. Lile and Herman H. Wieder for "Thin Film MIS Photovoltaic Detector", Ser. No. 249,339, filed on May 1, 1972, Navy Case 53,749.

BACKGROUND OF THE INVENTION

Currently, there are no passive solid state devices available for the direct electronic storage of electromagnetic information in the infrared region of the spectrum. There have been reported in the literature, observations of storage effects in an MIS structure built from bulk high purity single crystal InSb. Such a device is described by W. E. Krag et al., Journal of Applied Physics 40,3661 (1969). These effects were believed to result from the change in surface potential resulting from the activated trapping of electrons in the insulator layer under suitable bias-radiation conditions. We have discovered storage effects in MIS devices using low purity polycrystalline thin films of InSb prepared by previously described techniques on amorphous insulating substrates as disclosed in U. S. Pat. No. 3,600,237. These devices are simple and hence cheap to make and lend themselves to the fabrication of large area storage and imaging arrays limited in density only by current photolithographic techniques. Isolation between elements of such arrays as well as structural rigidity are provided by the insulating substrates employed.

SUMMARY OF THE INVENTION

The present invention provides a method of storing and retrieving information in a polycrystalline thin film MIS light sensitive diode by cooling the diode and then irradiating the diode with high frequency energy or temporarily applying an electric voltage depending upon the composition of the diode.

OBJECTS OF THE INVENTION

An object of the present invention is providing a method of storing and retrieving information from a MIS light sensitive diode.

Another object of the invention is providing a method of storing and retrieving information from a MIS light sensitive diode by irradiating the diode with radiant energy.

A further object of the invention is providing a method of storing and erasing information from a MIS light sensitive diode by temporarily applying an electric voltage across said diode.

Other objects and many of the attendant advantages of this invention will be readily appreciated as the same becomes better understood by reference to the following detailed description when considered in connection with the accompanying drawings.

DESCRIPTION OF THE PREFERRED EMBODIMENTS

Figure 1:
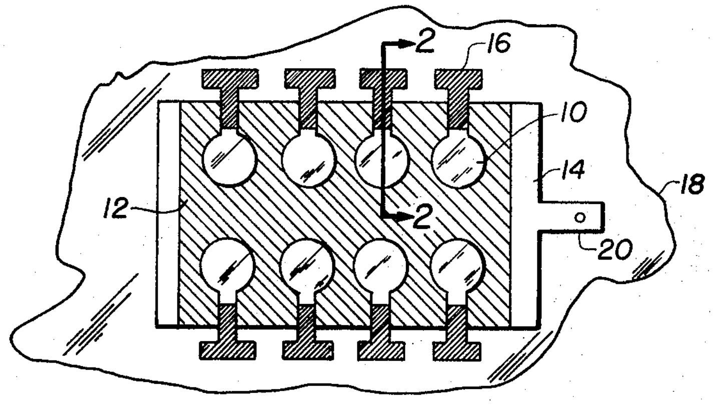
FIG. 1 is an eight-element thin film light sensitive detector array that can be used in accordance with the teaching of the invention.
Figure 2:
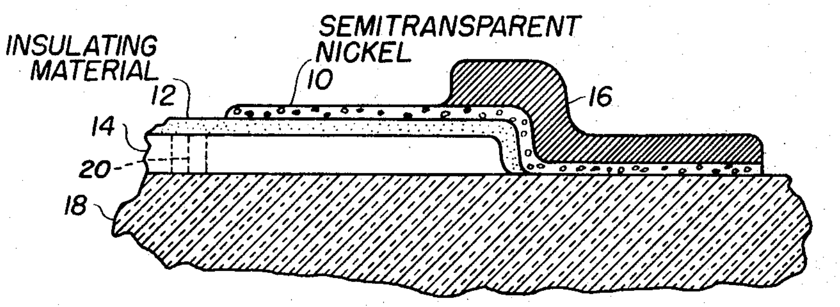
FIG. 2 is a partial sectional view of the array of FIG. 1.

A thin film MIS light sensitive diode with which the method may be practiced is shown and described in the above referenced patent application. As shown in FIGS. 1 and 2, the MIS diode consists of a three layer structure of a semitransparent metal 10, an insulator 12 and a semiconductor 14. Light incident on the metal is partially transmitted and if of sufficient energy to create electron hole pairs (energy above the fundamental edge) generates a surface photovoltage in the space charge region on the surface of the semiconductor. This photovoltage appears between the semiconductor 14 and the semitransparent metal electrode 10 to which it is capacitively coupled. The magnitude of the photovoltage depends on the extent of the surface space charge and hence on the surface potential of the semiconductor. Using zone crystallized layers of InSb with net donor densities of $\sim 2 \times 10^{16} cm^{-3}$ and electron mobilities of $\sim 50{,}000\ cm^2/v\text{-}sec$, detectivity D* values as high as $2.5 \times 10^{10} cm/watt\text{-}sec^{1/2}$ at 80°K can be obtained. Aluminum or any other suitable good conductor material 16 of approximately 1,000A. thickness is evaporated over the semitransparent metal 10 in the region near the edge of semiconductor 14 to form a continuous metallic bridge between the semitransparent metal 10 and the substrate 18 and provides a terminal for making an electrical connection.

We have found that a MIS light sensitive diode fabricated with InSb as the semiconductor and $In_2O_3$ as the insulator exhibits a change in photovoltaic response when cooled to approximately 80°K and irradiated with radiation of short wavelength (energy $\geq$ 1.5eV). The cooling must be done in the absence of radiating energy greater than 1.5eV. Once the diode has been cooled it is then irradiated with energy less than 1.5eV to establish a reference output voltage. The diode is then irradiated with energy greater than 1.5eV which will change its photovoltage response. This change in photovoltage response will persist indefinitely or until the diode is heated to a warmer temperature of approximately 300°K. The change in photovoltage response of the diode is determined by irradiating the cooled diode with energy less than 1.5eV and then measuring its output voltage across terminals 16 and 20. The rate at which the information is stored increases with increasing intensities of illumination Diodes fabricated using InSb as the semiconductor 14 and reactively evaporated $SiO_x$ as the insulating material, 12, can be made to change its photovoltage response by temporarily applying a voltage across terminals 16 and 20 of the diode. We have found that an electric field greater than approximately $2 \times 10^6 v/cm$ applied such that the metal electrode 16 is negative with respect to the semiconductor terminal 20 leads to a reversible stable increase in the photovoltaic response of the diode. This change in photovoltage response will persist until a voltage of opposite polarity is applied across the diode. Also the diode can be cooled in the presence of radiant energy above the 1.5eV energy level. This method may also be practiced with diodes having as the semiconductor 14, polycrystalline thin film InAs or $InSb_{1-x}As_x$.

Obviously many modifications and variations of the present invention are possible in the light of the above teachings. It is therefore to be understood that within the scope of the appended claims the invention may be practiced otherwise than as specifically described.

What is claimed is:

1. A method of storing electro-optic information in a thin film polycrystalline MIS storage light sensitive diode containing a layer of insulating material in contact with a thin film polycrystalline semiconductor material comprising the following steps in the order named:

a. cooling the diode to a temperature of approximately 80°K in the absence of radiation of energy greater than 1.5eV, b. irradiating said cooled diode with electromagnetic radiation of energy less than 1.5eV to produce a reference output voltage, c. applying to said cooled diode electromagnetic energy representing information to be stored, d. irradiating said cooled diode with electromagnetic radiation of energy less than 1.5eV, e. measuring the output voltage across said cooled diode to determine the change in photovoltage response which is a measure of the stored information.

2. The method of claim 1 further comprising the step of heating said cooled diode to a temperature of approximately 300°K to erase said previously stored information.

3. The method of claim 1 wherein the semiconductor element of said diode is a polycrystalline thin film of InSb and said layer of insulating material is anodically formed $In_2O_3$.

4. The method of claim 1 wherein said semiconductor element of said diode is polycrystalline thin film InAs.

5. The method of claim 1 wherein said semiconductor element is a polycrystalline thin film of $InSb_{1-x}As_x$.

6. A method of storing electrical information in a mis storage diode being both light sensitive and electrically sensitive containing a layer of insulating material in contact with a semiconductor material, comprising;

a. cooling said diode to a temperature of approximately 80°K, b. irradiating said cooled diode with electromagnetic radiation of energy above the fundamental edge of the semiconductor material and measuring the resulting output surface photovoltage of said cooled diode to determine an initial photovoltaic response of said diode, c. temporarily applying a voltage representing the information to be stored across said cooled diode, d. removing the applied voltage, e. measuring the output surface photovoltage of said cooled diode to determine the change in photovoltaic response which is a measure of the stored information.

7. The method of claim 6 further comprising the step of erasing said previously stored information by the temporary application of a voltage across said diode of opposite polarity and of equal or greater magnitude than said previously applied voltage.

8. The method of claim 6 wherein the semiconductor element of said diode is a polycrystalline thin film of InSb and said layer of insulating material is reactively evaporated $SiO_x$.

9. The method of claim 6 wherein said semiconductor element of said diode is a polycrystalline thin film of InAs.

10. The method of claim 6 wherein said semiconductor element of said diode is a polycrystalline thin film of $InSb_{1-x}As_x$.

* * * * *

UNITED STATES PATENT OFFICE
CERTIFICATE OF CORRECTION

Patent No. 3,789,369 Dated January 29, 1974

Inventor(s) DEREK L. LILE, ET AL

It is certified that error appears in the above-identified patent and that said Letters Patent are hereby corrected as shown below:

Column 4, line 1, cancel "mis" and insert -- MIS --.

Signed and sealed this 13th day of August 1974.

(SEAL)
Attest:

McCOY M. GIBSON, JR.
Attesting Officer

C. MARSHALL DANN
Commissioner of Patents